(12) United States Patent
Ogata et al.

(10) Patent No.: US 7,245,998 B2
(45) Date of Patent: Jul. 17, 2007

(54) APPARATUS FOR DETECTING ROLLOVER OF VEHICLE AND APPARATUS FOR ACTIVATING OCCUPANT PROTECTIVE DEVICE

(75) Inventors: Yoshihisa Ogata, Chiryu (JP); Seiya Ide, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/784,886

(22) Filed: Feb. 24, 2004

(65) Prior Publication Data

US 2004/0199317 A1 Oct. 7, 2004

(30) Foreign Application Priority Data

Feb. 25, 2003 (JP) .............................. 2003-047966
Feb. 26, 2003 (JP) .............................. 2003-049627

(51) Int. Cl.
*B60R 22/00* (2006.01)
(52) U.S. Cl. .................... 701/45; 701/39; 701/38; 180/282; 280/735
(58) Field of Classification Search ................ 701/45, 701/38, 39; 180/282; 280/735
See application file for complete search history.

(56) References Cited

U.S. PATENT DOCUMENTS 6,038,495 A * 3/2000 Schiffmann .................... 701/1
6,192,305 B1 * 2/2001 Schiffmann ................... 701/45

(Continued)

FOREIGN PATENT DOCUMENTS

JP 7-164985 6/1995

(Continued)

OTHER PUBLICATIONS

U.S. Appl. No. 10/443,800, filed May 23, 2003, Ide et al.

(Continued)

*Primary Examiner*—Thomas Black
*Assistant Examiner*—Brian J. Broadhead
(74) *Attorney, Agent, or Firm*—Posz Law Group, PLC

(57) ABSTRACT

An apparatus for detecting a rollover of a vehicle is provided. The apparatus comprises a detector, memory unit, calculator, and rollover determination unit. The detector detects a roll angular velocity of the vehicle. The memory unit memorizes a value of the roll angular velocity detected by the detector. The calculator calculates a predictive value to the roll angular velocity to be expected when a predetermined period of time elapses, by using a past value of the roll angular velocity of the vehicle, the past value being memorized in the memory unit. The rollover determination unit determines whether or not there is a possibility that the vehicle will make a rollover, on the basis of the predictive value to the roll angular velocity.

15 Claims, 8 Drawing Sheets

U.S. PATENT DOCUMENTS

| | | | |
|---|---|---|---|
| 6,438,463 B1 | 8/2002 | Tobaru et al. | 701/1 |
| 6,584,388 B2* | 6/2003 | Schubert et al. | 701/46 |
| 6,618,655 B2* | 9/2003 | Tobaru et al. | 701/45 |
| 6,654,671 B2* | 11/2003 | Schubert | 701/1 |
| 6,694,226 B2 | 2/2004 | Tobaru et al. | 701/1 |
| 6,701,276 B2* | 3/2004 | Kueblbeck et al. | 702/145 |
| 2002/0087235 A1* | 7/2002 | Aga et al. | 701/1 |
| 2002/0087243 A1* | 7/2002 | Sekizuka et al. | 701/45 |
| 2002/0099486 A1* | 7/2002 | Nagao et al. | 701/45 |
| 2003/0004627 A1* | 1/2003 | Williams et al. | 701/45 |
| 2004/0176893 A1* | 9/2004 | Ogata et al. | 701/45 |

FOREIGN PATENT DOCUMENTS

| | | |
|---|---|---|
| JP | A-2000-127891 | 5/2000 |
| JP | A-2001-74442 | 3/2001 |
| JP | 2001-260780 | 9/2001 |

OTHER PUBLICATIONS

U.S. Appl. No. 10/443,799, filed May 23, 2003, Ide et al.

U.S. Appl. No. 10/614,902, filed Jul. 9, 2003, Ogata et al.

Notification of Reasons for Rejection dated Jan. 24, 2007 issued from Japanese Patent Office for counterpart application No. 2003-049627 (English translation attached.).

* cited by examiner

| ROLLOVER MODE | ILLUSTRATION | FEATURES |
|---|---|---|
| FALL-OVER | 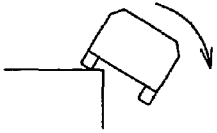 | LATERAL ACCELERATION : LOW<br>VERTICAL ACCELERATION : LOW<br>ANGULAR VELOCITY (RR) CHANGE : SMALL<br>ANGULAR VELOCITY RR : LOW |
| FLIP-OVER | 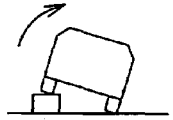 | LATERAL ACCELERATION : LOW<br>VERTICAL ACCELERATION : MEDIUM<br>ANGULAR VELOCITY (RR) CHANGE : MEDIUM<br>ANGULAR VELOCITY RR : MEDIUM |
| CURBSTONE TRIP-OVER | 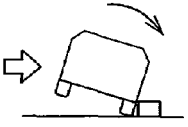 | LATERAL ACCELERATION : HIGH<br>VERTICAL ACCELERATION : MEDIUM<br>ANGULAR VELOCITY (RR) CHANGE : LARGE<br>ANGULAR VELOCITY RR : HIGH |

FIG. 9

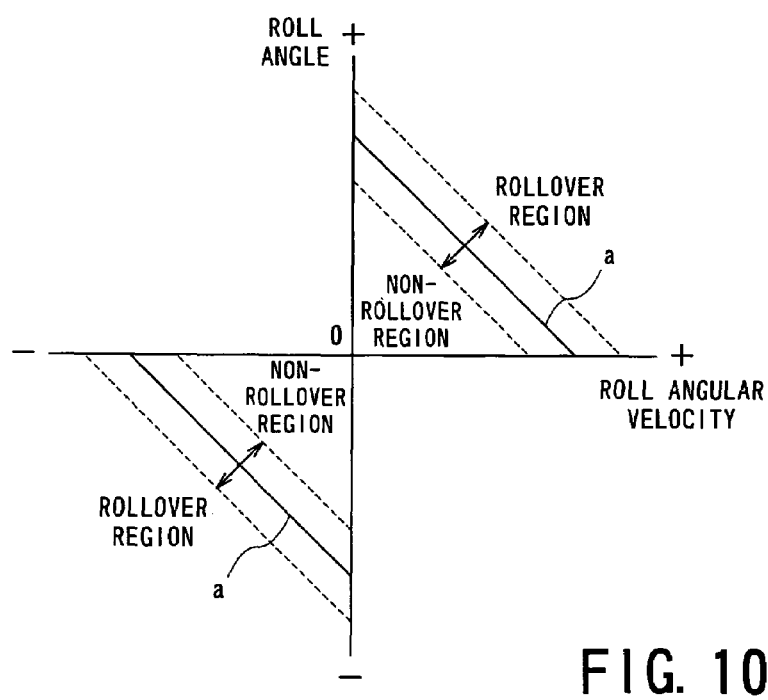

FIG. 10

APPARATUS FOR DETECTING ROLLOVER OF VEHICLE AND APPARATUS FOR ACTIVATING OCCUPANT PROTECTIVE DEVICE

BACKGROUND OF THE INVENTION

1. Technical Field

The present invention relates to an apparatus for detecting a rollover of a vehicle and an apparatus for activating occupant protective devices.

2. Related Art

Recent vehicles are frequently required to have a variety of safety devices for occupants. One of such devices is safety devices, such as pretensioners and shock absorbing airbags. These devices are very helpful for occupants when the vehicle makes a rollover or an overturn due to various reasons.

A variety of techniques for determining such a rollover, which is absolutely necessary for activating the occupant protective safety devices, has been proposed at present, as can be seen from Japanese patent-laid open KOKAI (unexamined) Nos. 7-164985 and 2001-260780.

The former proposes how to determine a turnover of a vehicle. According to this determination technique, an inclination angle of the vehicle and an inclination angular velocity thereof are detected to determine a vehicle's turnover using a relationship between the inclination angle and the inclination angular velocity. If this determined result reveals a possibility of causing the turnover, one or more occupant protective devices mounted on the vehicle are activated immediately.

However, this determination technique is still unsatisfied as described below. Though the rollover of the vehicle can be classified into many types in terms of their causes, one type is a rollover called "flip-over," in which wheels on one of the right and left sides of a vehicle run on an obstacle so that the vehicle makes a rollover. In this case, the vehicle rolls over at a faster speed, it is absolutely necessary to activate the occupant protective device(s) in an early stage during the rollover. However, in such an early stage, the inclination angle is still low. Hence, this conventional determination way concludes that the vehicle inclination in progress at present will not result in a rollover, whereby it is very difficult to activate the occupant protective device(s) in an early and proper timing during the rollover.

Of the foregoing prior art references, the latter (No. 2001-260780) provides how to determine whether or not there is a possibility that a vehicle will make over. This reference shows a two-dimensional map that uses two parameters consisting of a roll angle of a vehicle and a roll angular velocity thereof. Threshold lines are set on the map so as to form non-rollover regions showing non-rollover and rollover regions showing a possible rollover. Whether or not a history line defined by a roll angle and a roll angular velocity of a vehicle crosses one of the threshold lines from the non-rollover region to the rollover region shows whether or not that is a possibility of causing a vehicle's rollover, respectively. This determined result is then reflected in control of deploying air curtains and/or side airbags.

Furthermore, this rollover determination makes the threshold lines move in response to an increase in a side skid speed of the vehicle. This festinates the timing to start the deployment to protect the occupant in a trip-over. However this start timing is not always proper.

For example, assume that a vehicle whose height is high, such as SUV (Sports Utility Vehicles) crashes into a side of a parked vehicle. In such a case, a rollover may be caused, which is called "SUV side-impact originated rollover." In this rollover, the crashed vehicle makes a roll around axis passing the wheels on the non-crashed side immediately after the crash, and no side skid speed is detected. However, an occupant upper body is forced to swing toward the crash side immediately after the crash, so that it is necessary to deploy the driver's side devices such as air curtains in an early stage of the rollover. With regard to protecting the occupant from such rollovers, the foregoing determination based on the conventional map is not totally sufficient in detecting a more proper timing for deploying the safety devices.

SUMMARY OF THE INVENTION

The present invention has been made with due consideration to the foregoing difficulties, and a main object of the present invention is to optimize in timing the activation of occupant protective devices mounted on a vehicle.

A detailed object is to determine a vehicle's rollover at an early and proper timing to optimize activation of occupant protective devices mounted on a vehicle.

A further detailed object is to provide an apparatus for activating occupant protective devices, which is capable of determining a vehicle's rollover at an early and proper timing.

In order to accomplish the foregoing objects, as one aspect of the present invention, there is provided an apparatus for detecting a rollover of a vehicle, comprising: a detector detecting a roll angular velocity of the vehicle; a memory unit memorizing a value of the roll angular velocity detected by the detector; a calculator calculating a predictive value of the roll angular velocity to be expected when a predetermined period of time elapses, by using a past value of the roll angular velocity of the vehicle, the past value being memorized in the memory unit; and a rollover determination unit determining whether or not there is a possibility that the vehicle will make a rollover, on the basis of the predictive value of the roll angular velocity.

In this way, a value cite roll angular velocity generating in the past is used to predict a value of the roll angular velocity to be expected from now on. This predictive value of the roll angular velocity is then refledted in the determination of a vehicle's rollover. For example, a vehicle makes a rollover at a fast velocity, a temporal change amount of the roll angular velocity becomes larger, and the predictive value shows a larger amount as well. Accordingly, in determining whether or not there is a possibility of causing a rollover, the use of the predication value of the roll angular velocity leads to an early determination for a vehicle's rollover whose roll angular velocity is high.

It is preferred that the calculator be configured to use the value of the roll angular velocity to obtain a derivative of the roll angular velocity and to calculate the predictive value of to roll angular velocity using a Taylor's expansion of the derivative directed to a time instant when the predetermined period of time elapses.

It is also preferred that the apparatus comprises an acquiring unit requiring a roll angle of the vehicle, wherein the rollover determination unit is configured to perform the determination on the basis of a relationship between a value of the roll angle and the predictive value of the roll angular velocity. In this configuration, preferably, the acquiring unit is either a unit detecting the roll angle of the vehicle or a unit calculating the roll angle of the vehicle by integrating the roll angular velocity. It may also be possible that the rollover determination unit is configured to perform the determination in consideration of a relationship between the value of the roll angle and the value of the roll angular velocity.

As another aspect of the present invention, there is provided an apparatus for activating occupant protective devices mounted on a vehicle, the occupant protective devices being plural in number and being mounted on both lateral sides of the vehicle, respectively, the apparatus comprising: a roll angular velocity detector detecting a roll angular velocity of the vehicle; an acquiring unit acquiring a roll angle of the vehicle; a rollover determination unit performing a rollover determination whether or not there is a possibility that the vehicle will make a rollover, on the basis of a value of the roll angle and a value of the roll angular velocity; an acceleration detector detecting a lateral acceleration to be applied on the vehicle in a lateral direction of the vehicle; a side-impact determination unit performing a first side-impact determination determining whether or not there is a side impact applied on the vehicle on the basis of a value of the lateral acceleration detected by the acceleration detector and a second side-impact determination whether or not the side impact occur on which lateral side of the vehicle on the basis of the value of the lateral acceleration; and an activation control unit controlling activation of the occupant protective devices, every device mounted on each lateral side of the vehicle, using results determined by at least one of the rollover determination unit and the side-impact determination unit.

Preferably, the activation control unit is configured to control one or more devices of the plural occupant protective devices on the basis of a result of the first side-impact determination, the one or more occupant protective devices being mounted on a collision side of the vehicle decided by the second side-impact determination and to control remaining one or more devices of the plural occupant protective devices on the basis of a result of the rollover determination, the one or more remaining occupant protective devices being mounted on a non-collision side of the vehicle decided by the second side-impact determination.

Hence, even when the rollover is a rollover involving a high-level lateral acceleration in an early stage during the rollover, the occupant protective device mounted on a collision side of the vehicle can be activated by the side-impact determination, while the occupant protective device mounted on a non-collision side of the vehicle can be activated by the rollover determination. That is, the occupant protective devices can be activated individually using the mutually different determinations. Therefore, the timing to activate the occupant protective devices can be proper for the occupant. This activation manner is thus especially effective for rollovers called "curbstone trip-over" and "SUV side-impact originated rollover."

It is also preferred that the activation control unit is configured to control one or more devices of the plural occupant protective devices on the basis of at least one of a result of the first side-impact determination and a result of the rollover determination, the one or more occupant protective devices being mounted on a collision side of the vehicle decided by the second side-impact determination and to control one or more remaining devices of the plural occupant protective devices on the basis of a result of the rollover determination, the one or more remaining occupant protective devices being mounted on a non-collision side of the vehicle decided by the second side-impact determination.

Hence, this configuration is effective for a rollover in which a lateral acceleration first occurs and then or at almost the same time, a roll angular velocity occurs. In the vehicle receiving a side impact from a vehicle such as SUV, the occupant protective devices are also activated for every side of the vehicle. The occupant protective device on a collision side of the side-impacted vehicle can be activated based on the rollover determination as well as the side-impact determination. Thus, the collision-side device can be activated at an earlier and proper timing, thereby being optimized in the activation timing.

BRIEF DESCRIPTION OF THE DRAWINGS

Other objects and aspects of the present invention will become apparent from the following description and embodiments with reference to the accompanying drawings in which:

FIG. 9 is an illustration showing various modes of the rollover and their characteristics, which is used by a third embodiment of the present invention;

FIG. 10 is an illustration for adjustably changing the boundary lines on the map, the changing manner being employed by the third embodiment;

DETAILED DESCRIPTION OF PREFERRED EMBODIMENTS

Referring to the accompanying drawings, preferred embodiments of the present invention will now be described.

First Embodiment

Figure 1:
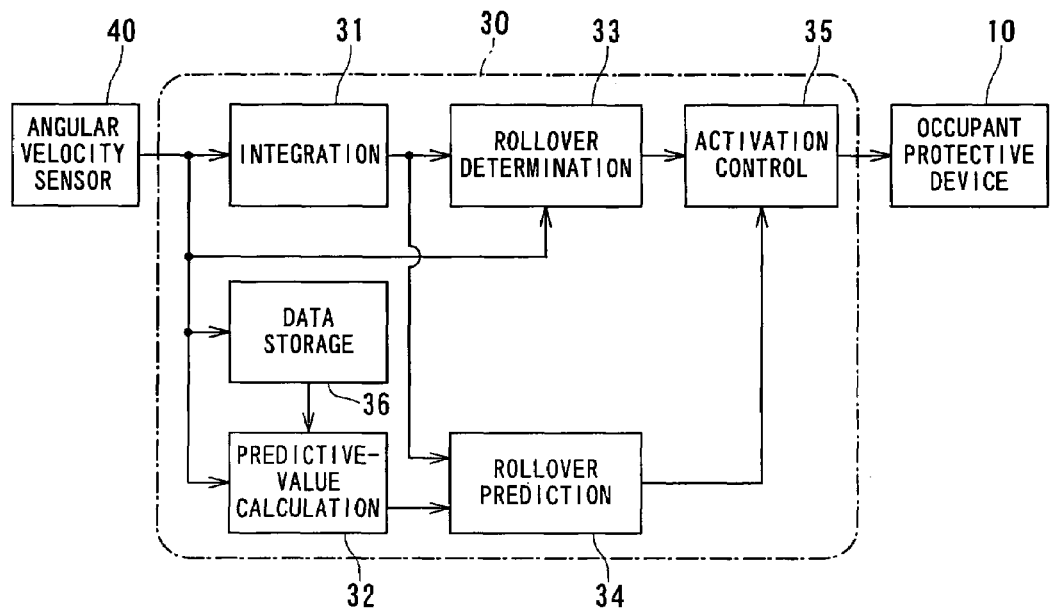
FIG. 1 is a functional block diagram showing a controller of an activation apparatus, serving as a vehicle rollover detecting apparatus, according to a first embodiment of the present invention.

Referring to FIGS. 1 to 4, a first embodiment of the present embodiment will now be described, FIG. 1 shows in a block form the outlined configuration of an apparatus for activating an on-vehicle occupant protective device. The activation apparatus is reduced into practice as a vehicle rollover detecting apparatus according to the present invention.

As shown in FIG. 1, the activation apparatus for the on-vehicle occupant protective device in this embodiment is provided with a controller 30 and an angular velocity sensor 40. The controller 30 is electrically connected to an occupant protective device 10.

The occupant protective device 10 includes, though no detailed by figures, pretensioners to remove accidental rotation of each sheet belt and head-protection airbags to be inflated and deployed between the occupants' heads and the cabin inner wall. When receiving a drive command from the controller 30, the occupant protective device 10 is forced to be in operation. Before and after the controller 30, such interfaces as an A/D converter and a D/A converter are disposed, though not shown.

The angular velocity sensor 40 is placed to detect a signal indicating an angular velocity around a longitudinal axis of the vehicle (i.e., a roll angular velocity RR). For example, the angular velocity sensor 40 is an acceleration sensor to sense a force caused at a predetermined mass in response to the rotation, a vibratory gyro, or a gas rate gyro. The signal detected by the angular velocity sensor 40 is sent to the controller 30.

The controller 30 functionally has an integration block 31, a predictive value calculating block 32, a rollover determining block 33, a rollover predicting block 34, an activation determining block 35, and a data storage 36.

The controller 30 is composed of, for example, a computer configuration in which a CPU (Central Processing Unit) and necessary memories are provided. The CPU, which reads out data of a predetermined software program from a memory and performs it, functionally realizes the above blocks, except the data storage 36, through its operations executed sequentially in time. In place of the computer configuration, the controller 30 can adopt electric circuitry consisting of analog and/or digital circuits disposed to realize the foregoing blocks in an equivalent manner.

The data storage 36, which is composed of one or more memories and a read/write circuit placed to read and write data from and into the memories, receives and memorizes, at intervals, data of a roll angular velocity RR obtained as an output signal from the angular velocity sensor 40. In addition, the data storage 36 is configured to delete the oldest data when the number of data to be memorized is over a predetermined number, before memorizing new data.

The integration block 31 receives the data of the roll angular velocity RR from the angular velocity sensor 40 to apply integration to the received data, so that an angle around the vehicle's longitudinal axis (i.e., roll angle RA) is calculated. The calculation is carried out based on, for example, the following formula:

$$RA = \int RR \cdot dt(t[t-1] \text{ to } t[t]) \qquad (1)$$

The predictive value calculating block 32 receives data of the roll angular velocity occurred in the past, which is also stored in the data storage 36, and calculates a derivative $Frr[t]$ of the roll angular velocity. Additionally, the block 32 uses this derivative $Frr[t]$ to obtain, by the Taylor's expansion, a predictive value RRY of the roll angular velocity at the next time instant coming when a predetermined period of time T has elapsed from the current time instant.

In this calculation, when the vehicle is in a fast rollover, the derivative is calculated up to a value in its order as high as possible, because the second or higher order derivative $Frr[t]$ of the roll angular velocity can be calculated. This way of calculation is helpful for calculating a high-accuracy predictive value RRY of the roll angular velocity. The predetermined period of time T can be set to an arbitrary value.

Figure 3:
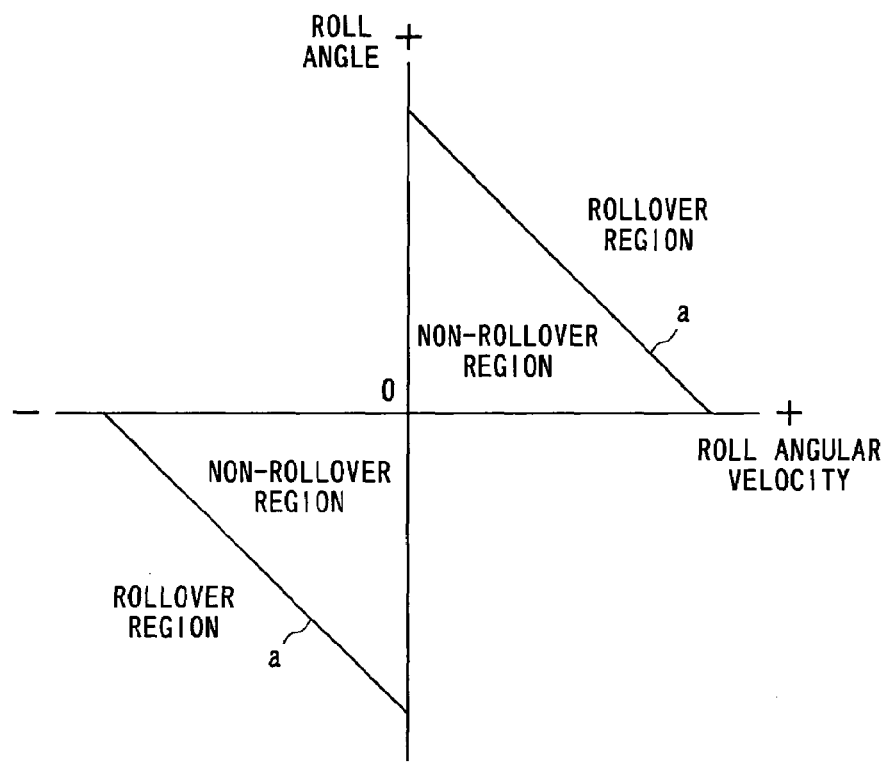
FIG. 3 is an illustration of the map showing a relationship between a roll angle and a roll angular velocity.

Using both the roll angle RA and the roll angular velocity RR, the rollover determining block 33 engages in determining whether or not there is a possibility of causing a vehicle's rollover. In order for the determination, this block 33 uses a map showing the relationship between the roll angles and the roll angular velocities. This map, which is exemplified in FIG. 3, is stored in the data storage 36. Practically the vehicle's rollover is determined by finding out that the current rolling state of the vehicle is mapped at which position on this map.

As exemplified in FIG. 3, depending on the absolute values of both the roll angle and the roll angular velocity, "rollover regions" showing that a vehicle's rollover may be caused are decided and distinguished from "non-rollover regions" showing that there is no possibility of a rollover of the vehicle.

Hence if being mapped in a non-rollover region, it is determined by the block 33 that there is no possibility of causing the vehicle to be rolled over. However, if a mapped position falls into a rollover region, it is decided that the vehicle has a possibility of being rolled over. The boundary lines "a" between the non-rollover and rollover regions on this map shown in FIG. 3 should be varied depending on the type of a vehicle. Such boundary lines "a" depend on vehicle types and are decided beforehand through simulations, experiments and others.

The rollover predicting block 34 is configured to receive data of both the roll angle RA and the predictive value RRY to the roll angular velocity to determine whether or not there is a possibility that the vehicle will roll over at a time instant when the predetermined period of time T passes. Practically, this block 34 operates to find out that a vehicle's rolling state appearing after the predetermined period of time T is mapped at which position on the map shown in FIG. 3, in which the relationship between the roll angle and the roll angular velocity is illustrated. If being mapped in a non-rollover region on the map, it is decided that there is no possibility that the vehicle will roll over at a time instant after the predetermined period of time T passes. In contrast, if the current vehicle's rolling state is mapped in a rollover region on the map, it is determined that there is a possibility that the vehicle will roll over at a time instant coming after a passage of the predetermined period of time T.

Using the determined results from both the rollover determining block 33 and the rollover predicting block 34, the activation determining block 35 then determines if the occupant protective device, 10 should be activated or not. Only when the determination is affirmative, that is, it is determined that the occupant protective device 10 should be activated, the block 35 operates to cause the protection 10 to be activated immediately.

The processing for both the rollover prediction and the rollover determination, which is characteristic of the present invention, will now be detailed in connection with flow-charts illustrated in FIGS. 2 and 4.

First, referring to FIG. 2, the rollover prediction will be explained, which is executed cooperatively by the integration block 31, predictive value calculating block 32, rollover predicting block 34, and data storage 36.

Figure 2:
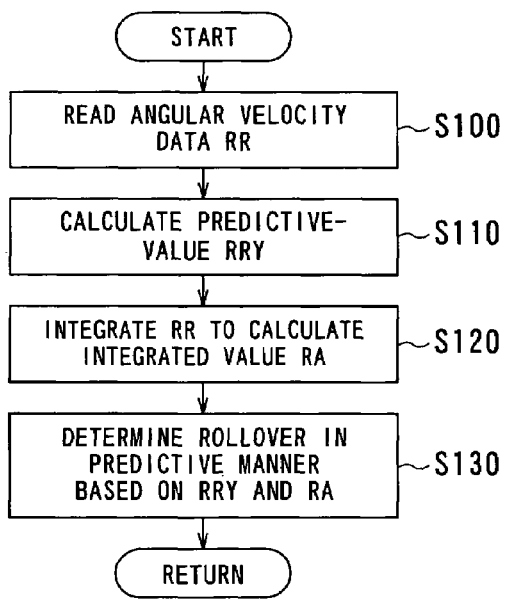
FIG. 2 is an outlined flowchart showing the processing for predicting rollover determination according to the first embodiment.

A step S100 in FIG. 2 data of a roll angular velocity RR is read in. Then at step S110, the roll angular velocity RR is subjected to calculation of a predictive value RRY of the roll angular velocity RR. At step S120, the data of the roll angular velocity RR undergoes integration to compute a roll angle RA.

At the next step S130, the map shown in FIG. 3 is used to specify a particular position on the map, the particular position being defined by both of the predictive value RRY of the roll angular velocity calculated at step S110 and the roll angle RA calculated at step S120. From this mapping work, the possibility that the vehicle makes a roll is determined.

Figure 4:
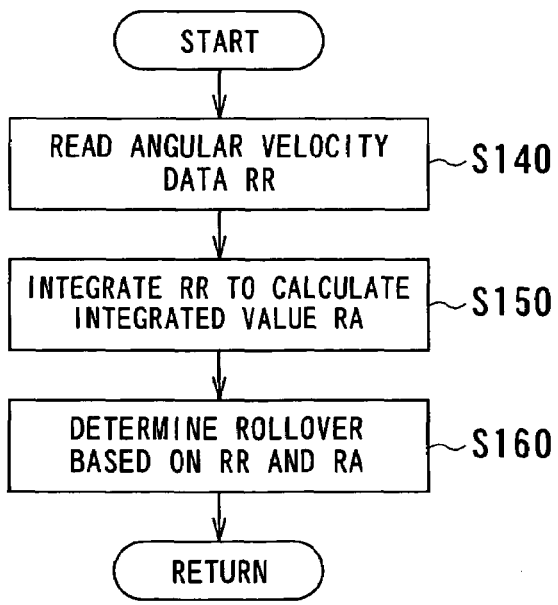
FIG. 4 is an outlined flowchart showing the processing for rollover determination according to the first embodiment.

Referring to FIG. 4, the rollover determination will now be described, which is executed cooperatively by the integration block 31 and rollover determining block 33.

Specifically, at step S140 in FIG. 4, data of the roll angular velocity RR is read by the integration block 31, and at step S150, the roll angular velocity RR is subjected to the integration thereat to compute a roll angle RA.

The processing is then moved to step S160, where the map shown in FIG. 3 is used again to specify thereon both a value of the roll angular velocity RR calculated at step S140 and a value of the roll angle RA calculated at step S150, so that it is determined whether or not there is a possibility that the vehicle will make a rollover.

Based on the determined results for the current rollover determination (at step S160) and the future rollover determination using the predictive value (at step S130), the activation determining block 35 finally determines whether the occupant protective device should be activated or not.

Thus, in the present embodiment, the activation apparatus for the occupant protective device applies a value of the past roll angular velocity to the calculation of a predictive value to a roll angular velocity to be caused in the future. And this predictive value is considered in finally deciding whether or not there is a possibility of a vehicle's rollover.

This final determination is carried out based on a predetermined algorithm.

Accordingly, in cases where a vehicle is in a fast rollover, a current temporal change in the roll angular velocity becomes larger in magnitude, with the result that the roll angular velocity to act on the vehicle at the next timing (i.e., in the future) exhibits a large value. Such a lager predictive value to the roll angular velocity can be considered in deciding whether or not there is a possibility that the vehicle makes a roll. This makes it possible to find out a vehicle rolling over at larger roll angular velocities as early as possible, thereby leading to activating the occupant protective device 10 in a steady fashion with no excessive delay.

Modification of the First Embodiment

In the above configuration of the controller 30, for determining whether or not there is a possibility of a vehicle's rollover at a time after a predetermined period of time T, both the roll angle RA and the predictive value RRY of the roll angular velocity are used by the rollover predicting block 34. Alternatively, this can be replaced with another configuration, in which the block 34 considers only the predictive value RRY of the roll angular velocity. For example, the larger the predictive value RRY, the higher the possibility of a vehicle's rollover. This determination way is still effective for determining a vehicle's rollover carried out at higher roll angular velocities in an earlier stage of the rollover.

Second Embodiment

Referring to FIGS. 3 to 7, a second embodiment of the vehicle rollover detecting apparatus according to the present invention, which is reduced into practice as an apparatus for activating an on-vehicle occupant protective device, will now be described.

In the second and subsequent embodiments, for the sake of a simplified explanation, the identical or similar components to those in the first embodiment will be given the same reference numerals, mainly explaining only components different from those in the first embodiment.

The apparatus for activating the on-vehicle occupant protective device is also directed to the determination whether or not there is a possibility that the vehicle will make a rollover, but how to determine such a possibility is different from that described in the first embodiment.

This difference will now be detailed. In the first embodiment, both the roll angle RA and a predictive value of roll angular velocity RRY are used to determine such a possibility at a time instant when a predetermined period of time T passes from the present. In contrast, in the second embodiment, the rollover predicting block 34 is functionally placed in the controller 30 shown in FIG. 5 so that the block 34 performs the determination in a different way. The rollover predicting block 34 uses a predictive value RAY of the roll angle, together with the already explained predictive value RRY of the roll angular velocity, to determine whether or not there is a possibility that the vehicle will make a rollover at a time instant when a predetermined period of time T elapses from the present.

Figure 5:
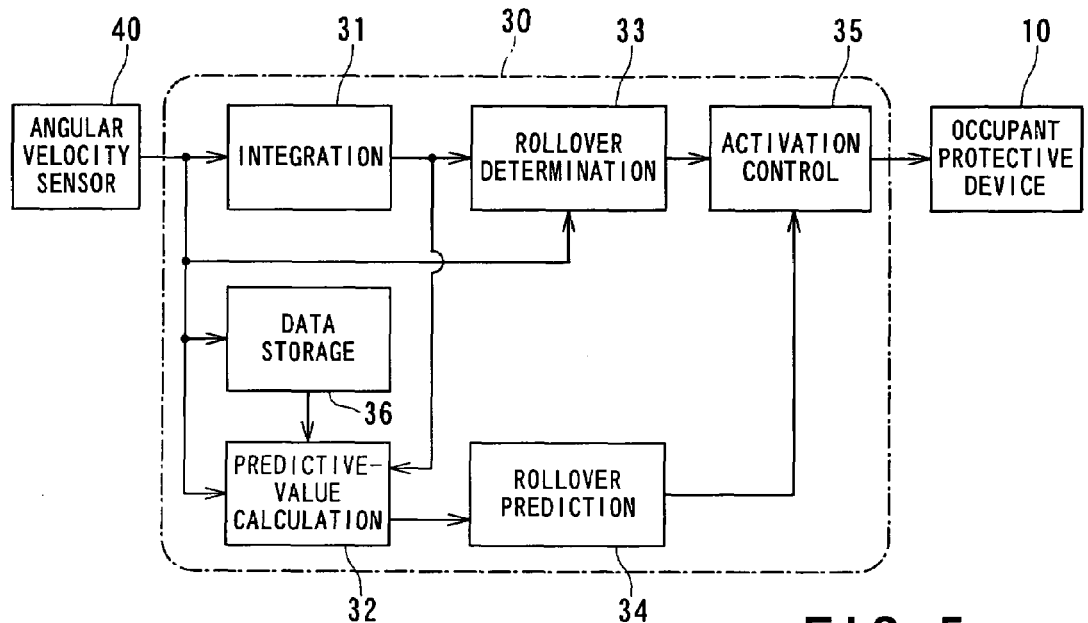
FIG. 5 is a functional block diagram showing a controller of an activation apparatus, serving as a vehicle rollover detecting apparatus, according to a second embodiment of the present invention.

Practically, as shown in FIG. 5, in the second embodiment, the predictive value calculating block 32 is placed to accept the data of the roll angle RA outputted from the integration block 31. This block 32 is thus configured to calculate not merely a predictive value RRY of the roll angular vetocity, like the first embodiment, but also a predictive value RAY of the roll angle to be expected after a predetermined period of time T with the use of the data of the roll angle from the integration block 31 and the revealed predictive value RRY of the roll angular velocity. The predictive value RAY of the roll angle can be computed on the following formula, for example.

$$RAY = RA[t] + \int RRY \cdot dt(t[t] \text{ to } t[t+T]) \quad (2)$$

In addition, the rollover predicting block 34 in the controller 30 is configured to receive both the predictive value RAY of the roll angle and the predictive value RRY of the roll angular velocity and perform a determination whether or not a vehicle's rollover will be caused at a time instant after a predetermined period of time T passes from the present time instant.

Using the relationship between the roll angle and the roll angular velocity, whose map is exemplified in FIG. 3, the rollover predicting block 34 finds out that a vehicle's rolling state is mapped at which position on the map when the predetermined period of time T passes. If the mapped point falls in a non-rollover region on the map, it is determined that no rollover occurs at the time instant when the predetermined time T passes. However, if the mapping is made within a rollover region on the map, the possibility that the vehicle will make a rollover after a predetermined time T is determined.

The processing for the above rollover prediction and rollover determination will now be detailed. Of this processing, the rollover determination processing is executed in the same way as that shown in FIG. 4, thereby being omitted from the explanation. Hence, referring to FIG. 6, the rollover prediction processing will now be detailed solely, which is carried out cooperatively by the integration block 31, predictive value calculating block 32, rollover predicting block 34, and data storage 36.

Figure 6:
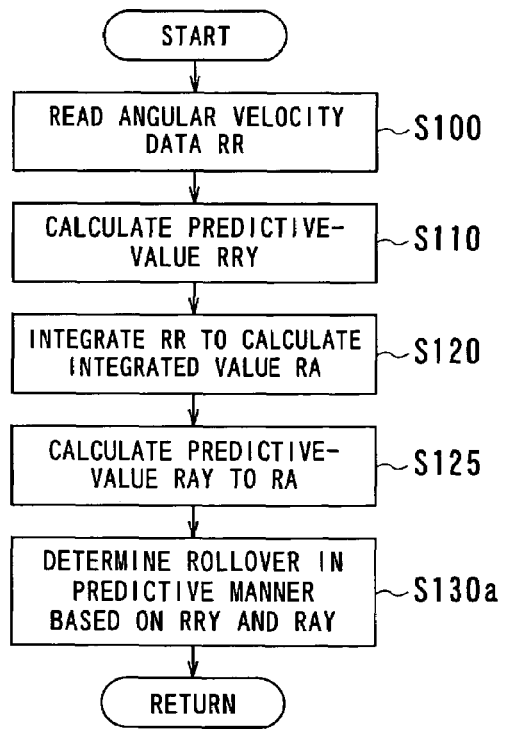
FIG. 6 is an outlined flowchart showing the processing for predicting rollover determination according to the second embodiment.

Steps S100 to S120 in FIG. 6 are the same as those in FIG. 2 showing the first embodiment. That is, at step S100, data of a roll angular velocity RR is read in. Then at step S110, the roll angular velocity RR is subjected to calculating a predictive value RRY of the roll angular velocity. At step S120, the data of the roll angular velocity RR undrgoes integration to compute a roll angle RA.

The processing is further moved to step S125, where the data of the roll angle RA is subjected to computation of a predictive value RAY of the roll angle RA based on, for example, the same way as that for the predictive value RRY of the roll angular velocity RR, as stated in the first embodiment.

The processing is then carried out at stop S130a, where the map exemplified in FIG. 3 is used to determine whether or not a vehicle's rollover will be caused at a time instant coming when to predetermined period of time T elapses. Practically, in the similar manner to the foregoing, both the predictive value RRY of the roll angular velocity (calculated at step S110) and the predictive value RAY of the roll angle (calculated at step S125) defines a point to be mapped on the map. A determined result (i.e., a rollover determined result for the vehicle's rolling state at a future predetermined time instant) at step S160 is handed to the activation determining block 35, to which a determined result (i.e., a rollover determined result for the current vehicle's rolling state) by the rollover determining block 33 is forwarded.

Based on the determined results for the current rollover determination (at step S160) and the future rollover determination using the predictive value (step S130a), the activation determining block 35 finally determines whether the occupant protective device should be activated or not.

Accordingly the activation apparatus according to the present embodiment is able to determine the possibility of occurrence of a vehicle's rollover using the relationship between the predictive values RAY and RRY of the roll angle and the roll angular velocity. Such an additional employment of the roll angle enables a vehicle's future rolling state to be predicted with more precision. It is therefore possible to determine, more accurately, whether or not the vehicle will make a rollover.

Third Embodiment

Referring to FIGS. 7 to 10, a third embodiment of the vehicle rollover detecting apparatus according to the present invention, which is reduced into practice as an apparatus for activating an on-vehicle occupant protective device, will now be described.

The activation apparatus according to the present embodiment takes it into account determining the modes of vehicle's rollovers and changing the characteristics of a map for the determination.

Figure 7:
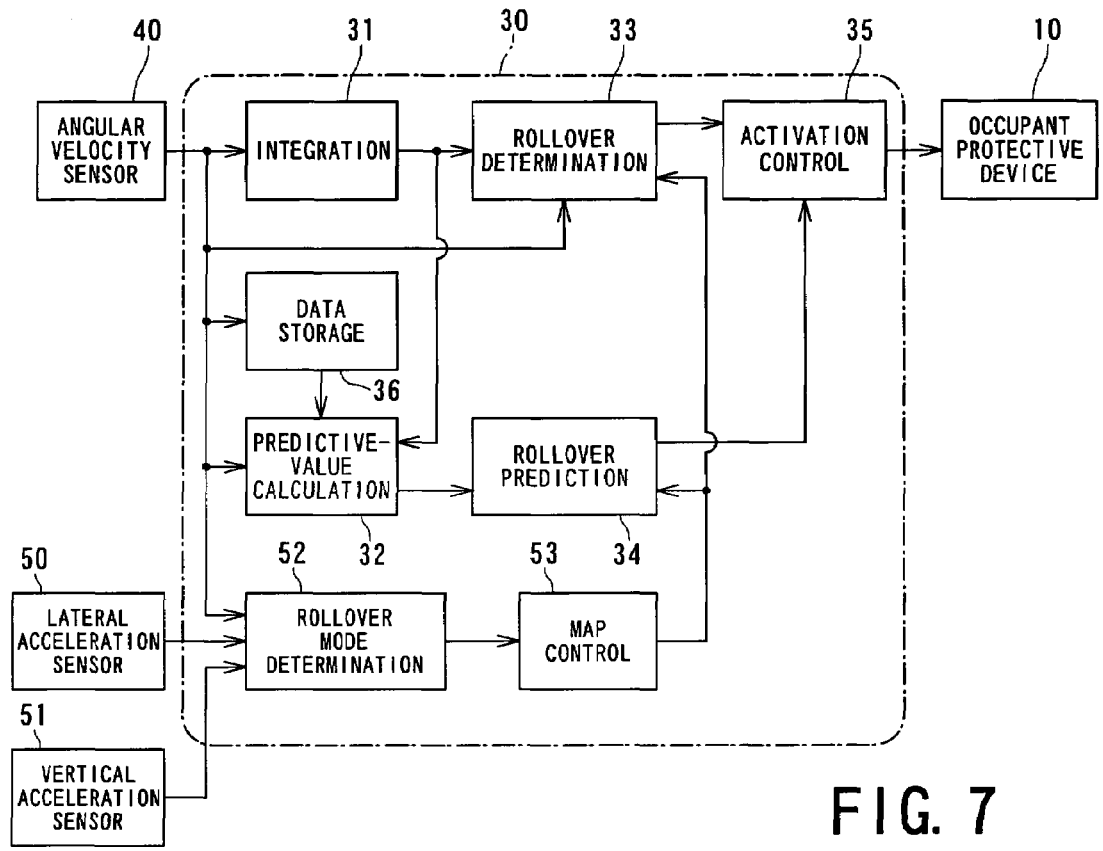
FIG. 7 is an outlined flowchart explaining adjustment of boundary lines on a map used for the rollover determination according to a third embodiment of the present invention.

Specifically, as shown in FIG. 7, the activation apparatus is equipped with lateral and vertical acceleration sensors 50 and 51 sensing the level of lateral acceleration acting on a vehicle in the lateral direction thereof and the level of vertical acceleration acting on the vehicle in the height direction (up-and-down direction) thereof. Signals indicative of the lateral acceleration and the vertical acceleration and sensed by the sensors 50 and 51 are sent to the controller 30. Both the acceleration sensors 50 and 51 are disposed, for example, at the center or in the vicinity thereof of a vehicle.

In the controller 30, the predictive value calculating block 32 produces difference values of the roll angular velocity, which are obtained in connection with calculating the predictive value RRY of the roll angular velocity.

As shown in FIG. 7, the controller 30 functionally includes a rollover mode determining block 52 and a map controlling block 53. The rollover mode determining block 52 receives data indicating both of the lateral acceleration and the up-and-down direction acceleration, difference values of the roll angular velocity, and the roll angular velocity RR, in order to determine what rollover mode is presented by the vehicle at present. Information showing the rollover mode is handed to the map controlling block 53. As shown in FIG. 10, this block 53 then controls a map used in both the rollover determining block 33 and the rollover predicting block 34 in such a manner that the positions of the boundary lines "a" on the map are updated depending on the determined rollover mode.

By way of example, the modes of rollovers can be classified into various types as shown in FIG. 9.

A first type of rollover mode is called "fall-over," which is a vehicle's rollover attributable to a vehicle's falling from a bank or others. When the "fall-over" occurs, both the lateral acceleration and the vertical acceleration are low in levels, the difference values of the roll angular velocity are small because of no rapid changes in the roll angular velocity, and a maximum of the roll angular velocity is low because of smallness of the roll angular velocity.

A second type of rollover mode is called "flip-over," which is a vehicle's rollover due to the fact that one or more wheels on one of lateral right and left sides of the vehicle run on an obstacle or others. When the "flip-over" occurs, the lateral acceleration is still low in level, while the vertical acceleration is about intermediate in level, which is relatively higher level than the lateral acceleration. Further, in this "flip-over," the difference values of the roll angular velocity are provided as intermediate amounts, because the roll angular velocity changes sharply. A maximum of the roll angular velocity is also relatively larger (i.e., intermediate) due to the larger roll angular velocity.

A third type of rollover mode is called "curbstone trip-over," which is a vehicle's rollover which may be caused when the vehicle skids to make one or more right or left wheels thereof bump into a curbstone or others, the vehicle making a roll with the curbstone serving as the fulcrum. When the "trip-over" occurs, the lateral acceleration is larger because of bumping into the curbstone, while the vertical acceleration is lower in level than the lateral acceleration. Further, in this "flip-over," the difference values of the roll angular velocity are provided as very large amounts, because the roll angular velocity changes more sharply than that in the "flip-over." A maximum of the roll angular velocity is also very large due to the fact that the roll angular velocity is generated as very large quantities.

Therefore, making reference to the lateral acceleration, vertical acceleration, roll-angular-velocity difference values, and roll angular velocity makes the rollover mode determining block 52 determine the type of rollover mode which may be caused at the vehicle.

Incidentally, the correspondences between reference values for those lateral acceleration, vertical acceleration, roll-angular-velocity difference values, and roll angular velocity and the types of rollover modes are decided in advance, for example, based on experiments or simulations. A variation to the above determining manner is to determine the type of rollover mode by using one factor or a combination of some factors selected from the above factors consisting of the lateral acceleration, vertical acceleration, roll-angular-velocity difference values, and roll angular velocity.

The fact that the roll angle RA and the roll angular velocity RR are different in amplitude from each other in each rollover mode can be utilized. That is, the map controlling block 53 makes use of such a characteristic in updating the boundary lines "a" on the map in compliance with the determined rollover mode. The map is used in common by both the rollover determining block 33 and the rollover predicting block 34.

Figure 8:
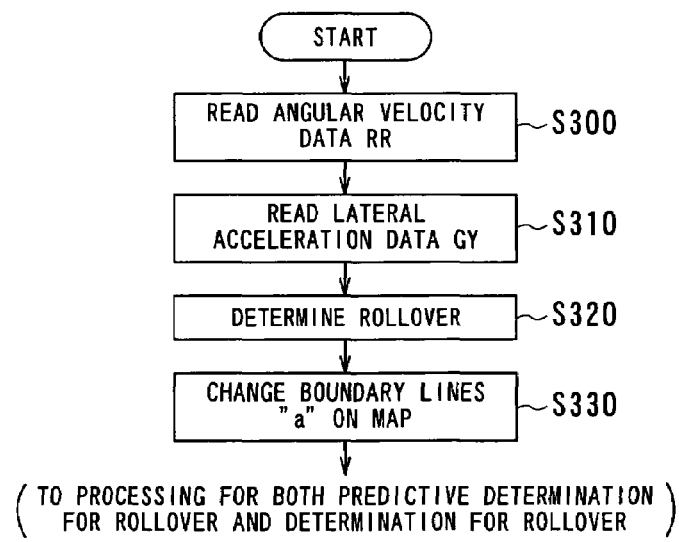
FIG. 8 is an outlined flowchart showing the processing for predicting rollover determination according to the second embodiment.

With reference to FIG. 8, the processing for updating the boundary lines "a" on the map will now be explained. The processing for the rollover prediction and rollover determination is similar or identical to that described in the first and second embodiments, thus being omitted here from being explained.

As step S300 in FIG. 8, the signal indicative of a roll angular velocity RR from the angular velocity sensor 40 is read in, and at step S310, the signals each indicating a lateral acceleration and a vertical acceleration from the sensors 50 and 51 are read in as well. The read-in signals are memorized as values of the velocity and accelerations.

Then, the processing is shifted to step S320, where the type of rollover mode, under which the vehicle may be in rollover, is determined by the rollover mode determining block 52 based on the values of the roll angular velocity RR, the lateral acceleration and the vertical acceleration. This determination can be performed by making reference to thresholds distinguishably decided depending on the types of the rollovers shown in FIG. 9. The thresholds are predetermined type by type for each of the lateral acceleration, the vertical acceleration, the roll angular velocity RR, and difference values concerning the velocity RR.

After this, the processing at step S330 is executed by the map controlling block 53 such that the block 53 updates the positions of the boundary lines "a" between the rollover and the non-rollover regions on the map. As described before, the map is used by the rollover determining block 33 and rollover predicting block 34.

Thus as shown in FIG. 10, according to the determined type of rollover mode, the boundary lines "a" are changed toward either the rollover sides or the non-rollover sides on the map in almost real time. In the example shown in FIG. 10, the inclinations of the boundary lines "a" are not changed, but this is not a definitive list. The inclinations are also changed to arbitrary ones depending on the determined type of rollover mode.

Hence, thanks to the processing carried by the blocks 52 and 53, the rollover which may occur actually is determined on its mode, so that the occupant protective device 10 can be activated in a controlled manner depending on the types of rollovers.

In the above embodiment, the number of rollover modes to be classified is not confined to three, but other modes, such as turnovers, can be added to the classified modes.

Modification of the Third Embodiment

A modification of the third embodiment relates to adjustable setting of the boundary lines "a" on the map shown in FIG. 10.

The foregoing curbstone trip-over generates a moment to cause a rollover immediately after a collision with a curbstone. Hence the lateral acceleration, roll angular velocity, and difference values of the roll, angular velocity exhibit large amounts, respectively. In contrast, in the case of a kind of trip-over, called sandy soil trip-over, in which a vehicle is moved sideways so that one(s) of the right and left wheels is made to step into a spot, such as sandy soil spot, and the vehicle makes a rollover around the wheel(s) on such a spot, generated is a moment lasting for a relatively longer time until a rollover. Hence, compared to the curbstone trip-over, the lateral acceleration, roll angular velocity, and difference values of the roll angular velocity exhibit smaller amounts, respectively, but still resulting in a rollover.

It is therefore understood that the rollovers classified as the same rollover mode show different-characteristic lateral accelerations. These differences can be used to controlling the positions of the foregoing boundary lines (i.e., threshold lines) on the map in compliance with, for example, the magnitude values of the lateral directions. This control can be done by, for example, the map controlling block 53 and creates the boundary lines "a" located on the map, which are fitted properly to the lateral acceleration to be applied on a vehicle.

The parameter for changing the positions of the boundary lines "a" in a controlled manner is not confined to the lateral acceleration, but a lateral velocity of a vehicle, which is generated in the lateral, that is, width direction of the vehicle can be used as such a parameter.

Fourth Embodiment

Figure 11:
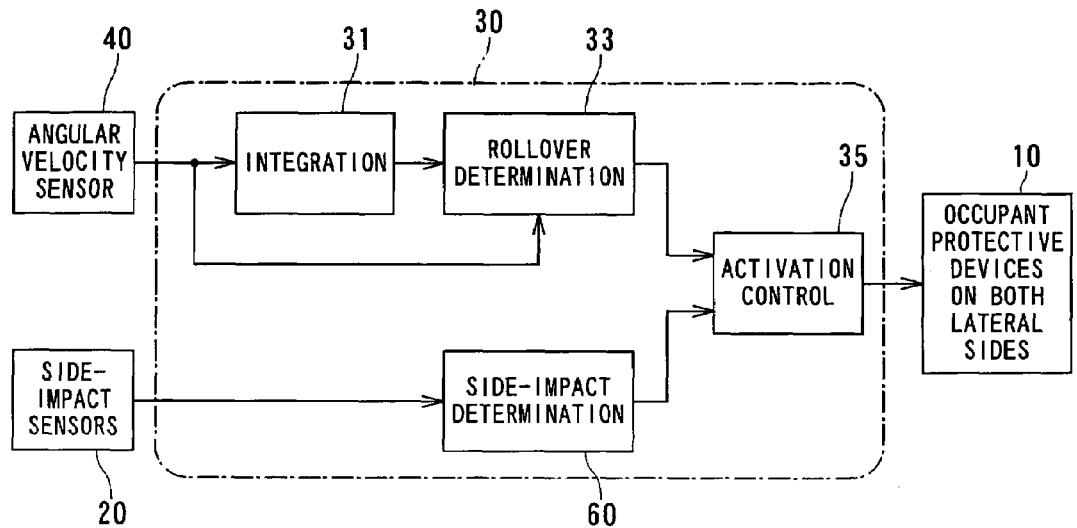
FIG. 11 is a functional block diagram showing a controller of an activation apparatus according to a fourth embodiment of the present invention.
Figure 12:
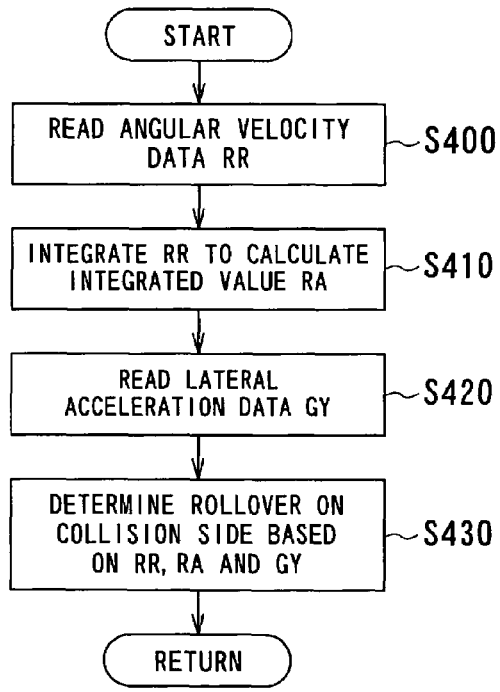
FIG. 12 is an outlined flowchart showing the processing for determining the activation of an occupant protective device mounted on a collision side of a vehicle in the fourth embodiment.
Figure 13:
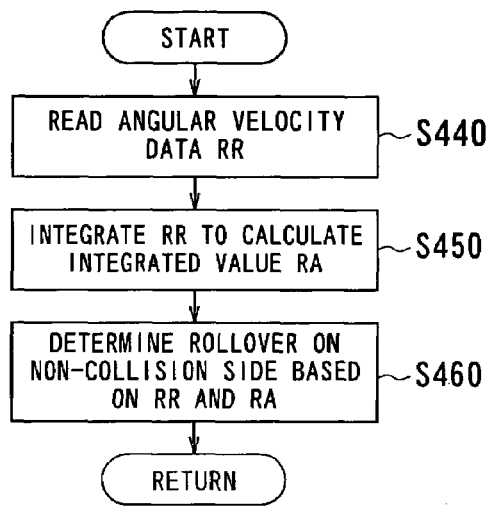
FIG. 13 is an outlined flowchart showing the processing for determining the activation of an occupant protective device mounted on a non-collision side of a vehicle in the fourth embodiment.

Referring to FIGS. 11 to 13, a fourth embodiment of the activating apparatus according to the present invention will now be descried.

The activation apparatus for the occupant protective device in the fourth embodiment is directed to determining the activation of on-vehicle occupant protective devices depending on which lateral side of the vehicle a side collision occurs.

As shown in FIG. 11, the activation apparatus is provided with side impact sensors 20, a controller 30, and an angular velocity sensor 40. Like the foregoing embodiments, the controller 30 is electrically coupled with occupant protective devices 10.

The occupant protective devices 10 include pretensioners to remove accidental rotation of each sheet belt and/or impact absorption airbags to be inflated between occupants' heads, chests, waists and/or others and the cabin inner wall. The occupant protective devices 10 are composed of at least two devices each disposed on both driver's and assistant driver's seat sides of a vehicle, respectively, and are responsive to activation commands from the controller 30 for their activations.

Each of the side impact sensors 20 is a sensor detecting a lateral acceleration GY applied on a vehicle in the lateral (width) direction thereof and disposed to sense an impact applied in the lateral direction. The side impact sensors 20 include at least two sensors each fixed on a lower end portion of each of center pillars on both driver's and assistant driver's seat sides and signals detected by the sensors 20 are fed to the controller 30.

The angular velocity sensor 40 is formed and placed in the same manner as that in the foregoing embodiments and is able to detect an angular velocity around the longitudinal axis of the vehicle, that is, a roll angular velocity RR.

The controller 30, which has the configuration of a computer, as exemplified in the foregoing embodiments, has functional processing blocks consisting of an integration block 31, rollover determining block 33, side-impact determining block 60, and activation determining block 35.

Of these blocks, the integration block 31 computes a roll angle RA, as explained in connection with the formula (1). The rollover determining block 33, which memorizes therein the data of the map shown in FIG. 3, uses the map to determine whether or not there is a possibility that the vehicle makes a roll at present. This determination is the same as that described already.

The side-impact determining block 60 is placed to determine if a value of the lateral acceleration GY is equal to or more than a predetermined threshold GTth. Further, the activation determining block 35 is configured to receive data showing determined results at both the rollover determining block 33 and the side-impact determining block 60 in order to perform a determination whether or not the occupant protective devices 10 should be activated.

In the present embodiment, the controller 30 is configured to make all the blocks 31, 33, 35 and 60 work to determine and activate each of the occupant protective devices 10 arranged on both the driver's and assistant driver's seat sides. Practically, not particularly illustrated though, the side-impact determining block 60 makes a comparison between the absolute values of the signals detected by both the side impact sensors 20 arranged on both the driver's and assistant driver's seat sides. This absolute-value comparison makes it possible to decide that a detected signal whose absolute value is larger than the other is a collision-side signal. It is logically possible that the remaining detected signal is regarded as a non-collision-side signal.

Using each of the collision-side signal and the non-collision-side signal, the activation determining block 35 is configured to separately determine and activate each of the occupant protective devices 10 mounted on both collision and non-collision sides of the vehicle. The collision side means one of the vehicle's lateral sides, on which a collision occurs. Thus the non-collision side is the opposite vehicle's side in the lateral direction thereof.

Referring to FIGS. 12 and 13, the processing for activating the occupant protective devices 10 will now be described.

FIG. 12 outlines the processing for determining the activation of the occupant protective device 10 mounted on a collision side of the vehicle.

As stated in the first embodiment, at step S400 in FIG. 12, the signal of a roll angular velocity RR is read by the controller 30 and converted to corresponding digital data. Then at step S410, the converted digital data, that is, the roll angular velocity RR, is subjected to integration at the integration block 31 to calculate data of a roll angular RA.

The processing is then shifted to step S420, where signals from the side-impact sensors 20 on both vehicle lateral sides are read by the controller 30 and converted to corresponding digital data, respectively. The side-impact determining block 60 first decides which signal is from the side-impact sensor 20 mounted on a vehicle's collision side through the foregoing comparison between the absolute values of the signals from the sensors 20. As a result, at step S420, data of a lateral acceleration GY coming from the side-impact sensor 20 mounted on the vehicle's collision side can be decided by the side-impact determining block 60. In addition, at step S420, the decided lateral acceleration GY is then compared with the predetermined threshold GYth whether or not a relation of GY≧GYth (in absolute values) is established or not. Information indicating whether the relation of GY≧GYth is met is provided to the activation block 35.

The processing in the controller 30 is then shifted to step S430 executed by the rollover determining block 33. Practically, at step S430, the map shown in FIG. 3 is used by this block 33 to determine if or not there is a possibility of causing a vehicle's rollover by pointing out on the map a position defined by a combination of the read-in roll angular velocity RR (at step S400) and the computed roll angle RA (at step S410). Information indicating whether or not there is a possibility that the vehicle will make a rollover is also provided to the activation block 35.

Based on the information supplied by the blocks 60 and 33 (i.e., both of a determined result concerning the possible vehicle's rollover and a determined result concerning the lateral acceleration GY), the activation block 35 engages in determining whether or not the occupant protective device 10 mounted on the vehicle's collision side is necessary to be activated. By way of example, when the determined results show that there is a possibility that the vehicle will make a rollover and the lateral acceleration GY is equal to or larger than its threshold GYth, the activation determining block 35 recognizes that the occupant protective device 10 mounted on the vehicle's collision side should be activated. In such a case, a command to activate the device 10 is issued from the block 35 (i.e., the controller 30) to the corresponding device 10 mounted on the vehicle's collision side.

On the other hand, FIG. 13 outlines the processing for determining the activation of the occupant protective device 10 mounted on the non-collision side of the vehicle.

Like the steps S400 and S410, data of a roll angular velocity RR is taken in (step S440), and the roll angular velocity RR is subjected to integration to calculate data of a roll angle RA (step S450).

The processing in the controller 30 is then shifted to step S460 executed by the rollover determining block 33. Practically, at step S460, the map shown in FIG. 3 is used by this block 33 to determine if or not there is a possibility of causing a vehicle's rollover by pointing out on the map a position defined by a combination of the read-in roll angular velocity RR (at step. S440) and the computed roll angle RA (at step S450). Information indicating whether or not there is a possibility that the vehicle will make a rollover is also provided to the activation block 35.

Hence the block 35 operates to finally conclude whether or not the occupant protective device 10 mounted on the vehicle's non-collision side is required to be activated. If the conclusion shows the activation, a command for the activation is issued to the occupant protective device 10 mounted on the vehicle's non-collision side. However, in the case of the non-activation, such a command will be issued, thus keeping the non-activation of the device 10.

As described above, in the activation apparatus according to the present embodiment, the occupant protective device 10 mounted on the vehicle's collision side is differentiated from that mounted on the vehicle's non-collision side in how to determine the activation. In the present embodiment, the former device 10 undergoes the determination based on the lateral acceleration as well as the roll angular velocity and the roll angle. In contrast, the latter one undergoes the determination based on only the roll angular velocity and the roll angle. That is, the activation of the occupant protective device 10 mounted on the vehicle's collision side is determined with higher precision.

It is therefore possible that, for a vehicle's rollover called "trip-over" in an early stage of which a larger-amplitude lateral acceleration will occur, information in relation to the lateral acceleration is taken into account in determining the activation of the occupant protective devices 10. In other words, the activation of the collision-side-mounted device 10 is determined by taking the amplitude of the lateral acceleration into account. Concurrently, the activation of the non-collision-side-mounted device 10 is determined on the ordinary manner. As a result, the occupant protective devices 10 can be activated at timing most proper for the occupants. Especially, owing to the fact that the lateral acceleration is considered, thus, being more accurate in finding out appropriate activation timing, the collision-side-mounted device 10 is able to work without fail.

Modification of the Fourth Embodiment

In the above, the determination at step S430 in FIG. 12 is executed based on the lateral acceleration GY as well as the roll angular velocity RR and roll angle RA, but this is not a decisive determination manner. An alternative is that the determination is executed using only the largeness relationship between the lateral acceleration GY and the threshold GYth thereto. This determination manner still takes the lateral acceleration into account, whereby a higher-amplitude lateral acceleration in an early state of a vehicle's rollover, if occurring, can be detected without fail, leading to an earlier (but still appropriate timing) activation of the collision-side occupant protective device 10.

Fifth Embodiment

Figure 14:
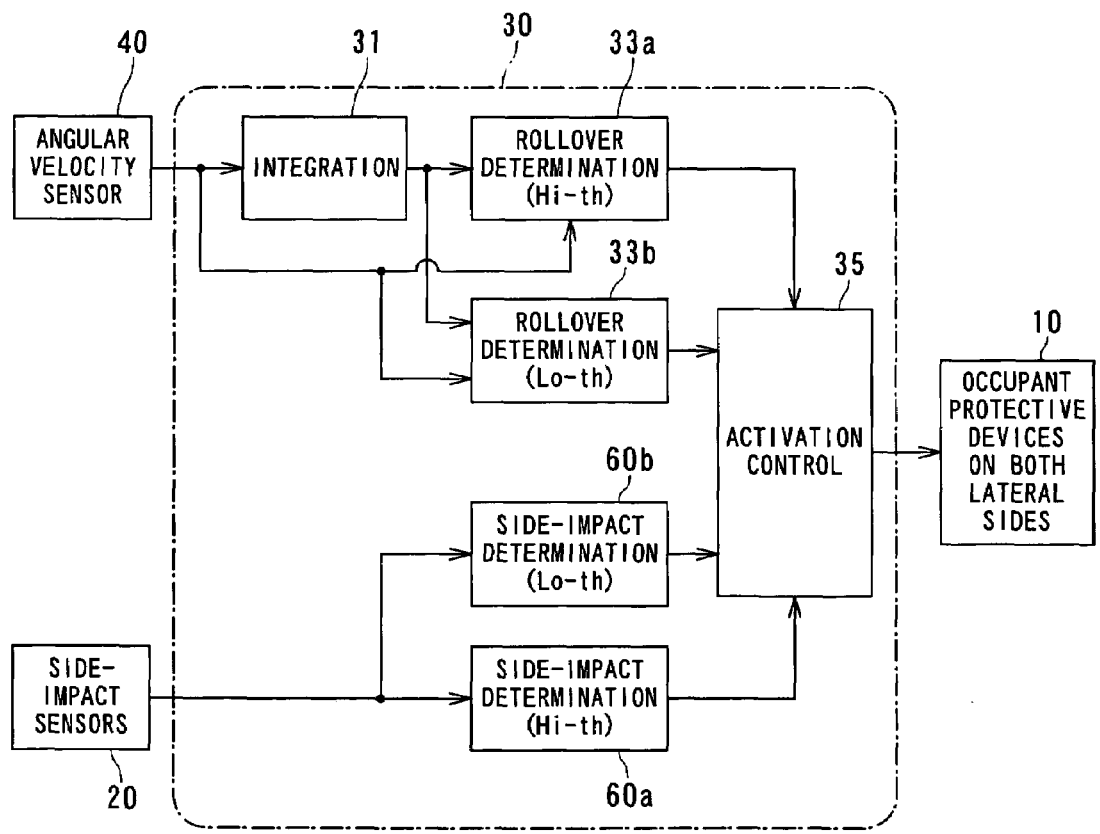
FIG. 14 is a functional block diagram showing a controller of an activation apparatus according to a fifth embodiment of the present invention.
Figure 15:
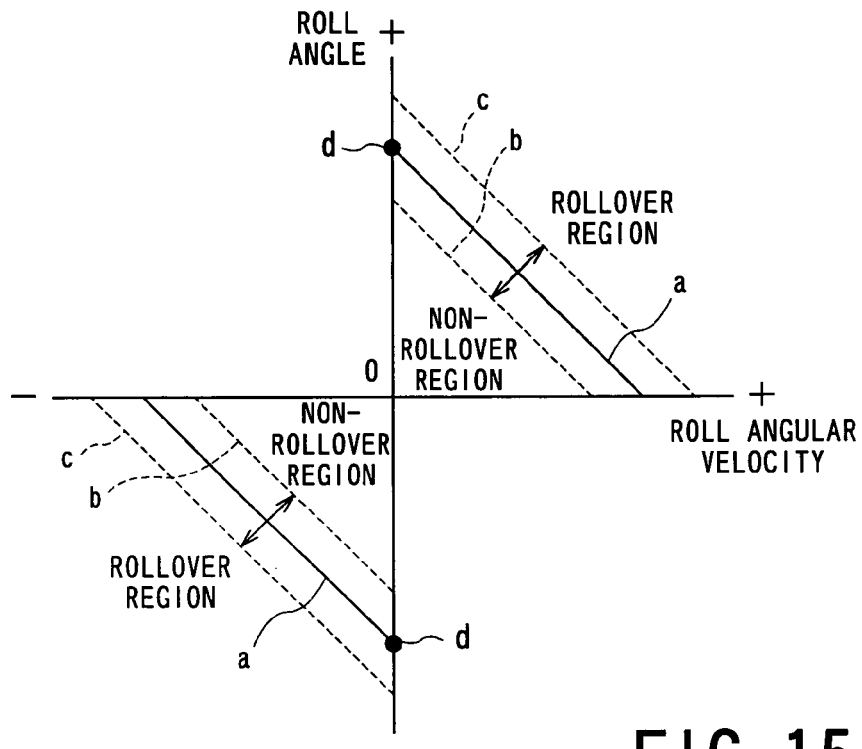
FIG. 15 is an illustration for adjustably changing the boundary lines on the map, the changing manner being employed by a fifth and a sixth embodiments of the present invention.
Figure 16:
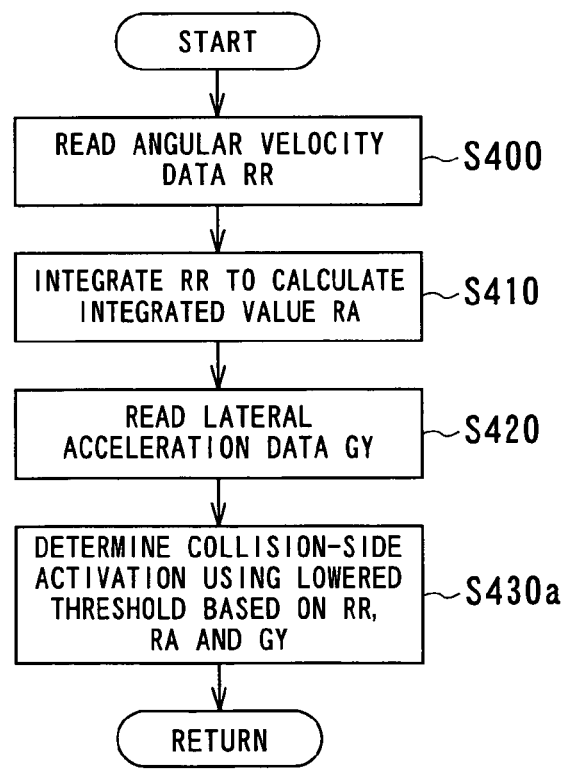
FIG. 16 is an outlined flowchart showing the processing for determining the activation of an occupant protective device mounted on a collision side of a vehicle in the fifth embodiment.

Referring to FIGS. 14 to 16, a fifth embodiment of the activation apparatus according to the present invention will now be descried.

The activation apparatus according to the present embodiment concerns with a finer determination for activating the occupant protective devices 10.

In the case of the foregoing "SUV side-impact originated rollover," it is frequent that kinetic energy generated on a collision is absorbed by a vehicle that caused the collision or a vehicle that suffered the collision. In such a case, some situations show that the collision-suffering vehicle generates a lower lateral acceleration and a smaller roll angular velocity. Hence it is difficult to activate a collision-side occupant protective device of the collision-suffering vehicle in an early stage of the collision.

In the present embodiment, to avoid such a difficulty, the map used for determining a vehicle's rollover is altered such that the boundary lines on the map include additional lines each exhibiting a lower threshold for determining vehicle's rollovers. Because these additional boundary lines have predetermined lower thresholds, the possibility that a vehicle's rollover will occur tends to appear more often. Additionally, the side-impact determination is carried out using a threshold set to a lower value.

FIG. 14 shows an outlined configuration of the activation apparatus for the occupant protective devices, which is reduced into practice in the present embodiment. As shown therein, the rollover determining block is composed of two rollover determining blocks 33a and 33b, which are functionally in parallel to each other. One block 33a is in charge of determining the possibility of vehicle's rollovers based on the boundary lines "a" on the map shown in FIG. 3, as described already. Information indicating this determined result is sent to the activation determining block 35 for the occupant protective device 10 mounted on a vehicle's non-collision side.

On the other hand, the rollover determining block 33b uses boundary lines "b" on a map shown in FIG. 15 when the block 33b determines whether or not there is a possibility that the vehicle will make a rollover. On the map, the boundary lines "b" is located closer to the origin of the map than the boundary lines "a," so that the boundary lines "b" lowers a level required for the determination that the vehicle will make a rollover. Information indicating the determined result in the block 33b is also sent to the activation determining block 35 for the occupant protective device 10 mounted on a vehicle's collision side.

As shown in FIG. 14, the controller 30 is also equipped with a configuration for determining a side impact to the vehicle, the configuration being composed of two side-impact determining block 60a and 60b. Of there, one block 60a is responsible for, like the fourth embodiment, determining whether or not the lateral acceleration detected by one of the side-impact sensors 20 is not less than the predetermined threshold GYth. This threshold GYth is the same level as that used in the fourth embodiment.

By contrast, the other side-impact determining block 60b determines whether or not the lateral acceleration GY is not less than a threshold GYLoth preset beforehand lower than the foregoing threshold GYth ($\geq$ GYLoth).

Information showing determined result at the blocks 60a and 60b is sent to the activation determining block 35. The information resultant from the block 60b is directed for controlling the activation of the occupant protective device 10 mounted on a vehicle-collision side. For lower values of the lateral acceleration, the lowered threshold GYLoth is helpful in that a requirement for the determination that the vehicle will make a rollover is lowered.

With reference to FIG. 16, the processing for determining the activation of the occupant protective apparatuses 10 will now be explained. In this description, the processing for determining the activation of an occupant protective apparatus 10 mounted on a vehicle's non-collision side is the same as that described in the fourth embodiment, thereby being omitted from being described again.

At step in FIG. 16, as described already, data of a roll angular velocity RR is taken in, and at step S410, data of a role angle RA is calculated by applying integration to the roll angular velocity RR. At step S420, by the rollover determining block 33b, data of lateral acceleration GY from the side-impact sensors 20 are taken in and the lateral acceleration GY from a collision-side mounted side-impact sensor 20 is adopted.

The processing is then shifted to step S430a, where map data defined by the boundary lines "b" on the map shown in FIG. 15 is used to determine whether or not there is a possibility that the vehicle will make a rollover. To be specific, the rollover determining block 33b maps both the value of the roll angular velocity RR read at step S400 and the value of the roll angle RA calculated at step S410 to specify a point on the map. Depending on the position existing in which of the non-collision area and the collision area divided by the boundary lines "b," such a possibility will be determined.

In addition, at step S430a, the side-impact determining block 60b determines if or not the value of the lateral acceleration GY read at step S420 is larger than the predetermined lowered threshold GYLoth.

Information indicative of results determined by both the blocks 33b and 60b is sent to the activation determining block 35. Hence, based on both of determined results about the possibility of a vehicle's rollover and determined results about the lateral acceleration GY, the activation of an occupant protective device 10 mounted on a vehicle's collision side is controlled. For example, in cases where the determination reveals that there is a possibility of occurring a vehicle's rollover and the current lateral acceleration GY is larger (than the threshold GYLoth), a vehicle-collision-side mounted occupant protective device 10 is activated immediately. This activation control allows the vehicle-collision-side mounted occupant protective device 10 to be activated in an early stage of the rollover, without an excessive delay.

Modification of the Fifth Embodiment

A modification of the above determination manner can be provided as follows. In the fifth embodiment, the early activation for a vehicle-collision-side mounted occupant protective device 10 has been realized by using the lowered boundary lines "b" on the map and the lowered threshold GYLoth for determining the lateral acceleration GY. This is however just one example. An alternative is to allow the controller 30 to use a difference value of a roll angular velocity RR. Practically, the controller 30 calculates a difference value D_RR between a current value and a previous value (a value obtained at the last detection timing) of a roll angular velocity RR, and determines whether or not the difference value D_RR is larger than a predetermined threshold Dth. And the controller 30 performs the determination based on the boundary lines "a" on the map.

The determined results on the boundary lines "a" and difference value D_RR are then applied to activation control of the collision-side mounted occupant protective device 10.

On the other hand, the non-collision-side mounted occupant protective device 10 will not be controlled under the determination carried out on this difference value D_RR.

As a result, if a vehicle's rollover exhibits a higher roll angular velocity RR in an early stage of the rollover, the collision-side mounted occupant protective device 10 can be activated without an excessive delay, due to taking the difference value D_RR into account. In parallel with this control, the non-collision-side mounted occupant protective device 10 can be activated at timing appropriate for the occupants, because no factor about the difference value D_RR is included in the determination.

Sixth Embodiment

A sixth embodiment of the activation apparatus according to the present invention will now be described.

The activation apparatus according to the present embodiment concerns with a finer determination for activating an occupant protective device mounted on a non-collision side of a vehicle.

In the foregoing fourth and fifth embodiments, activating an occupant protective device 10 mounted on a vehicle's non-collision side has been determined based on the boundary lines "a" set on the map shown in FIG. 3. This determination, however, can be modified into another way. One example is to use another map on which the boundary lines to divide the collision regions from the non-collision regions. Practically, the foregoing boundary lines "a" are shifted on the map to form further boundary lines "c," which departs from the origin of the map than the boundary lines "a." As a result, the boundary lines "c" raise a level required for the determination that the vehicle will make a rollover. This makes it possible that a vehicle's non-collision side occupant protective device is activated at more proper timing.

That is, as shown in FIG. 15, a map on which boundary lines "c" are set is used to determine if or not there is a possibility that a vehicle will make a rollover. As shown, compared to the foregoing boundary lines "a," the boundary lines "c" are more distant from the origin of the map so that it is more difficult to issue the determination that the vehicle will make a rollover. The determination on the map with the boundary lines "c" thereon is carried out at step S460 shown in FIG. 13.

Based on this determination, the occupant protective device 10 mounted on the vehicle's non-collision side can be activated at the timing when the roll angle RA reaches a certain higher level and the roll angular velocity RR reaches a certain higher level. As a result, the activation timing for the non-collision side can be optimized for the occupants.

Incidentally, to activate the occupant protective device 10 mounted on the vehicle's non-collision side can be determined using the roll angle RA solely. For example, when the value of the roll angle RA is larger (in an absolute value) than an amount shown by each point "d" at which each of the boundary lines "a" intersects the roll angle velocity axis, it can be determined that there is a possibility of causing a vehicle's rollover. Thus the points "d" can be referred to as an arbitrary threshold. The points "d" are not limited to the above intersecting points, but may be set to at any locations. Those thresholds also permit the non-collision-side mounted occupant protective device 10 to be activated properly at timing when the roll angle RA reaches a certain large level.

Modifications of the Sixth Embodiment

A first modification is to determine the activation of the non-collision-side mounted occupant protective device 10 depending on the mode of a "trip-over." For example, in the "curbstone trip-over," an occupant's upper body is swung toward a collision side in an early stage of the rollover, and then, immediately, the occupant's upper body is swung back toward the non-collision side. This means that the collision-side and non-collision-side occupant protective devices 10 should be activated in an early stage under the curbstone trip-over. Meanwhile, in the case of a "SUV side-impact originated rollover," the situation is considerably different from the curbstone trip-over. That is, though the occupant's upper body is swung toward a collision side at an early time during the rollover, the timing at which the swing-back of the occupant's upper body to the non-collision side begins is delayed compared to that during the curbstone trip-over.

As explained above, in the rollover modes classified into the same trip-over, the occupant's upper bodies are swung back to a non-collision side at mutually different timings. Hence proper timings when the non-collision-side occupant protective device 10 is activated should also be differentiated. The rollover mode is therefore determined based on both the direction of the lateral acceleration and the rotating direction of the roll angular velocity. If the rollover mode is the "SUV side-impact originated rollover," the activation of the non-collision-side occupant protective device 10 is positively delayed in timing compared to the collision-side occupant protective device 10.

To be specific, the curbstone trip-over generates a lateral acceleration in a direction from a vehicle's side no-colliding with a curbstone to the opposite vehicle's side colliding with the curbstone, while the SUV side-impact originated rollover generates a lateral acceleration from a vehicle's collision side to the vehicle's non-collision side. In addition, the curbstone trip-over involves a rotation around a collision-side curbstone serving as a supporting point, whilst the SUV side-impact originated rollover involves a rotation around an axis passing non-collision-side wheels (i.e., supporting points). Hence, based on a combination of the polarities of the lateral acceleration and the polarities of the roll angular velocity, the mode of the trip-over can be decided.

When being determined that the trip-over is a curbstone trip-over, the non-collision-side occupant protective device 10 is activated at proper timing for the occupants.

This activation technique can also be applied to a kind of trip-over, called sandy soil trip-over, in which a vehicle is moved sideways so that one(s) of the right and left wheels is made to step into a spot, such as sandy soil spot, whose surface friction coefficient differs from the road and the vehicle makes a roll around the wheel(s) on such a spot.

A second modification relates to an issue that which side occupant protective device is activated based on which side determination result. In the forgoing, the determination whether or not the occupant protective devices 10 mounted on a vehicle's non-collision side is activated is directly reflected into the activation of such devices 10 including pretentioners and shock absorbing airbags. This activation can be modified in a different way. By way of example, the pretensioner(s) mounted on a vehicle's non-collision side can be activated responsively to a result from the activation determination for the collision-side device 10. And the determination for the non-collision-side device 10 is directed to the activation for only the shock absorbing airbag(s) mounted on the vehicle's non-collision side. This makes it possible to restrain the occupant on the sheet even in an early stage during a rollover.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application Nos. 2003-47996 filed on Feb. 25, 2003 and 2003-49627 filed on Feb. 26, 2003 including the specification, claims, drawings and summary are incorporated herein by reference in its entirety.

What is claimed is:

1. An apparatus for detecting a rollover of a vehicle, comprising:
   a roll angular velocity detector periodically detecting a roll angular velocity of the vehicle at intervals;
   a memory unit memorizing values of the roll angular velocity periodically detected by the roll angular velocity detector;
   a predictive angular velocity calculator calculating a predictive value of the roll angular velocity to be expected after an elapse of a predetermined period of time on the basis of a present value and a past value of the roll angular velocity memorized in the memory unit; and
   a rollover prediction unit predicting whether or not there is a possibility that the vehicle will make a rollover, on the basis of the predictive value of the roll angular velocity, and one of: a value of the roll angle of the vehicle and a predictive value of the roll angle to be expected after the elapse of the predetermined period of time.

2. The apparatus according to claim 1, wherein the predictive angular velocity calculator is configured to use the present and past values of the roll angular velocity to obtain a derivative of the roll angular velocity and to calculate the predictive value of the roll angular velocity using a Taylor's expansion of the derivative directed to a time instant after an elapse of the predetermined period of time.

3. The apparatus according to claim 1, comprising
   an acquiring unit acquiring the roll angle of the vehicle, and
   a rollover determination unit is configured to perform the determination on the basis of a relationship between a value of the roll angle and the predictive value of the roll angular velocity.

4. The apparatus according to claim 3, wherein the acquiring unit is formed as either a unit detecting the roll angle of the vehicle or a unit calculating the roll angle of the vehicle by integrating the roll angular velocity.

5. The apparatus according to claim 3, wherein the rollover determination unit is configured to perform the determination in consideration of a relationship between the value of the roll angle and the present and past values of the roll angular velocity.

6. The apparatus according to claim 1, comprising
   a predictive angle calculator calculating the predictive value of the roll angle to be expected after the elapse of the predetermined period of time by using the predictive value of the roll angular velocity, and
   a rollover determination unit configured to perform the determination on the basis of a relationship between the predictive value of the roll angle and the predictive value of the roll angular velocity.

7. The apparatus according to claim 3, wherein the rollover determination unit has a two-dimensional map of which dimensions are the roll angle and the roll angular velocity, boundary lines being set on the map to form a first region showing a possibility of a vehicle's rollover and a second region showing no possibility of the vehicle's rollover, and means for performing to determination by pointing at a point on the map, the point being defined by both the value of the roll angle and the value of the roll angular velocity.

8. The apparatus according to claim 7, comprising
   a lateral acceleration detector detecting a lateral acceleration of the vehicle detectable in a lateral direction of the vehicle;
   a vertical acceleration detector detecting a vertical acceleration of the vehicle detectable in a vertical direction of the vehicle;
   a difference value calculator calculating a difference value of the roll angular velocity using the present and past values of the roll angular velocity memorized in the memory unit;
   a rollover mode determination unit determining a rollover mode of the vehicle based on at least one of the lateral acceleration, the vertical acceleration, the difference value of the roll angular velocity, and the roll angular velocity; and a controlling unit controlling positions of the boundary lines on the map depending on the mode of the rollover determined by the rollover mode determination unit.

9. The apparatus according to claim 7, comprising a lateral acceleration detector detecting a lateral acceleration of the vehicle detectable in a lateral direction of the vehicle; and a controlling unit controlling positions of the boundary lines on the map depending on a level of the lateral acceleration detected by the lateral acceleration detector.

10. An apparatus for activating occupant protective devices mounted in a vehicle, the occupant protective devices being plural in number and being mounted on both lateral sides of the vehicle, respectively, the apparatus comprising:

a roll angular velocity detector periodically detecting a roll angular velocity of the vehicle;

an acquiring unit periodically acquiring a roll angle of the vehicle;

a rollover determination unit having a two-dimensional map of which two dimensions are the roll angle and the roll angular velocity, boundary lines being set on the map to form a first region showing a possibility of a vehicle's rollover and a second region showing no possibility of the vehicle's rollover, means for performing the rollover determination by pointing at a point on the map, the point being defined by both the value of the roll angle and the value of the roll angular velocity, means for performing a further determination determining a magnitude relation between a difference of a current value of the roll angular velocity derived from a value of the roll angular velocity detected last time and a predetermined value, and means for causing the rollover determination performing means to perform the rollover determination additionally using a result performed by the further determination;

an acceleration detector periodically detecting a lateral acceleration of the vehicle detectable in a lateral direction of the vehicle;

a side-impact determination unit performing a first side-impact determination using a magnitude relation between the value of the lateral acceleration and a predetrmined acceleration threshold to determine whether or not there is a side impact on the vehicle, and a second side-impact determination using the value of the detected lateral acceleration to determine on which lateral side of the vehicle the side impact occurs; and an activation control unit configured to control one more occupant protective devices of the plural occupant protective devices on the basis of both a result of the first side-impact determination and a result of the rollover determination, the one or more occupant protective devices being mounted on a collision side of the vechicle decided by the second side-impact determination, and configured to control one or more remaining occupant protective devices of the plural occupant protective devices on the basis of a result of the rollover determination, the one or more remaining occupant protective devices being mounted on a non-collision side of the vechicle decided by the second side-impact determination.

11. The apparatus according to claim 10, wherein the acquiring unit is formed as either a unit detecting the roll angle of the vechicle or a unit calculating the roll angle of the vechicle by intergrating the roll angular velocity.

12. The apparatus according to claim 10, wherein the boundary lines on the map are adjustable toward positions closer to an origin of the map; and the acceleration threshold is adjustable so that the acceleration threshold is lowered.

13. The apparatus according to claim 10, wherein the boundary lines on the map are adjustable to positions on the map in a direction departing from an origin of the map.

14. The apparatus according to claim 10, comprising a rollover mode determination unit determining whether or not a mode of the rollover is a trip-over, based on a generating direction of the lateral acceleration and a rotating direction of the roll angular velocity, wherein the activation control unit, when the rollover mode determination unit determines that the mode of the rollover is the trip-over, controls the activation of the occupant protective device mounted on a non-collision lateral side of the vehicle on the basis of the result determined by the rollover determination unit, the non-collision lateral side being determined by the second side-impact determination.

15. The apparatus according to claim 10, wherein the occupant protective devices include a side airbag device to be inflated and deployed on an inside wall of a cabin of the vebicle and the activation control unit controls the activation of the side airbag device mounted on a non-collision lateral side of the vehicle in response to the result determined by the rollover determination unit, the non-collision lateral side being determined by the second side-impact determination.

* * * * *